United States Patent [19]
Rotzien

[11] Patent Number: 5,860,536
[45] Date of Patent: Jan. 19, 1999

[54] SKI RACK

[76] Inventor: Merv Rotzien, P.O. Box 1158, Sechelt, British Columbia, Canada, VON 3A0

[21] Appl. No.: 960,251

[22] Filed: Oct. 29, 1997

[51] Int. Cl.[6] ........................................... A47F 7/00
[52] U.S. Cl. ..................... 211/70.5; 211/85.7; 211/88.01; 224/917.5; D6/552
[58] Field of Search .................. 211/85.7, 70.5, 211/41.1, 88.01, 60.1, 62, 63; 224/917.5, 915; D6/552

[56] References Cited

U.S. PATENT DOCUMENTS

| D. 386,030 | 11/1997 | York | D6/552 |
|---|---|---|---|
| 4,678,087 | 7/1987 | York | 211/70.5 |
| 4,700,847 | 10/1987 | Shieh | 211/62 |
| 4,785,980 | 11/1988 | Redick | 211/70.5 X |
| 4,936,470 | 6/1990 | Prindle | 211/88.01 X |
| 5,285,906 | 2/1994 | Wisnowski et al. | 211/70.5 |
| 5,477,968 | 12/1995 | Largent et al. | 211/60.1 |
| 5,520,291 | 5/1996 | Graham | 211/70.5 X |
| 5,584,403 | 12/1996 | Sipperly | 211/63 |
| 5,649,633 | 7/1997 | Bellevose | 211/70.5 |

*Primary Examiner*—Robert W. Gibson, Jr.

[57] ABSTRACT

A ski rack has walls spaced-apart to define a space for receiving skis, with spacers extending downwardly within the space for separating the skis. The spacers are spaced from one of the walls by a gap, which enables the insertion of a snowboard, having a width substantially greater than that of the skis, to be inserted into the space.

3 Claims, 3 Drawing Sheets

SKI RACK

BACKGROUND OF THE INVENTION

1. Field of the Invention

The present invention relates to ski racks and, more particularly, to ski racks for mounting on gondolas and other conveyances for skiers.

2. Description of the Related Art

When skiers enter a gondola, to be transported up a ski slope, there is a need for the provision, on the exterior of the gondola, of a rack into which the skiers can insert their skis, so that the skis do not have to be carried into the gondola.

It is accordingly known to provide, for a gondola, a ski rack having upwardly open, laterally adjacent openings for receiving the skis. For that purpose, the widths of these openings are designed somewhat greater than the width of a conventional ski, in order to allow this ski to be inserted into the opening.

However, such prior art ski racks are not capable of accommodating the much wider snowboards which have recently become widely used on snow slopes, and also they are not wide enough to accommodate the relatively wide, so-called "parabolic" and "fat boy" skis which have now come into use.

BRIEF SUMMARY OF THE INVENTION

It is accordingly an object of the present invention to provide a novel and advantageous ski rack which can receive conventional skis, and space the conventional skis apart from one another, and which can also receive a snowboard or relatively wide ski.

According to the present invention, a ski rack comprises first and second walls defining therebetween a space for receiving skis, a bottom portion extending between the walls at the bottom of the space for supporting the ends of the skis and spacers projecting from one of the walls towards the other of the walls for spacing the skis apart from one another. The spaces are spaced from the other of the walls by a gap sufficient to accommodate a snowboard, so that the rack can be used to carry the snowboard, when required.

Preferably, the spacers extend along the space in a direction towards the bottom portion and have downwardly inclined edges extending in said direction, and spaced from said other wall by the gap, whereby the sliding of the snowboard into the gap is facilitated.

BRIEF DESCRIPTION OF THE DRAWINGS

The invention will be more readily understood from the following description of a preferred embodiment thereof given, by way of example, with reference to the accompanying drawings, in which.

DESCRIPTION OF THE PREFERRED EMBODIMENT

Figure 1:
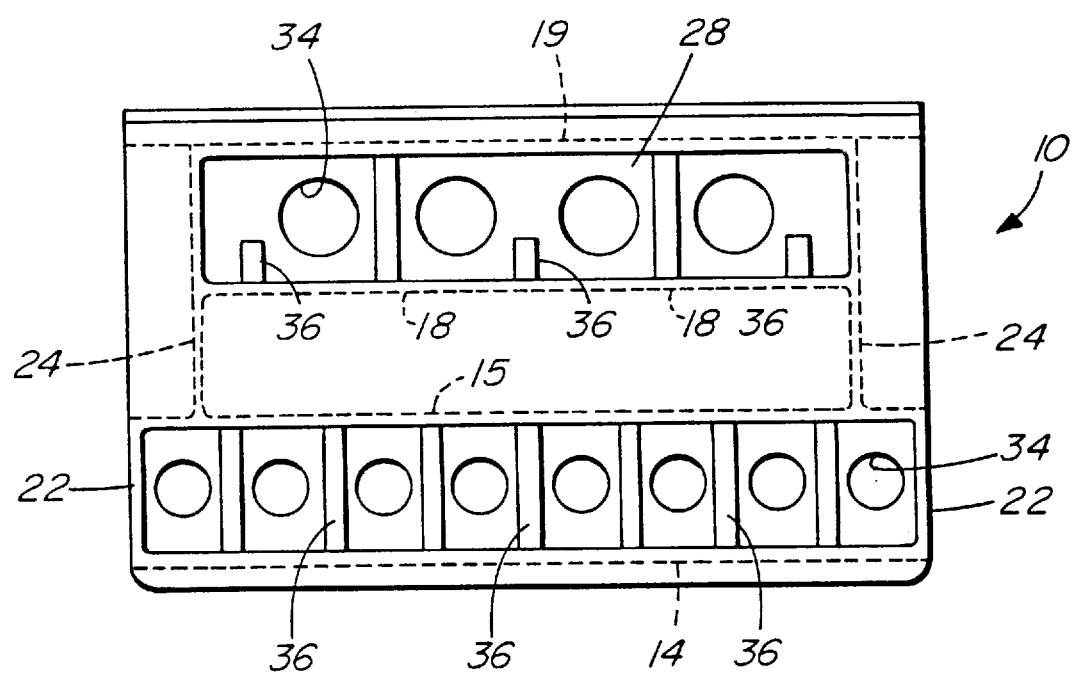
FIG. 1 shows a top view of a ski rack embodying the present invention.
Figure 2:
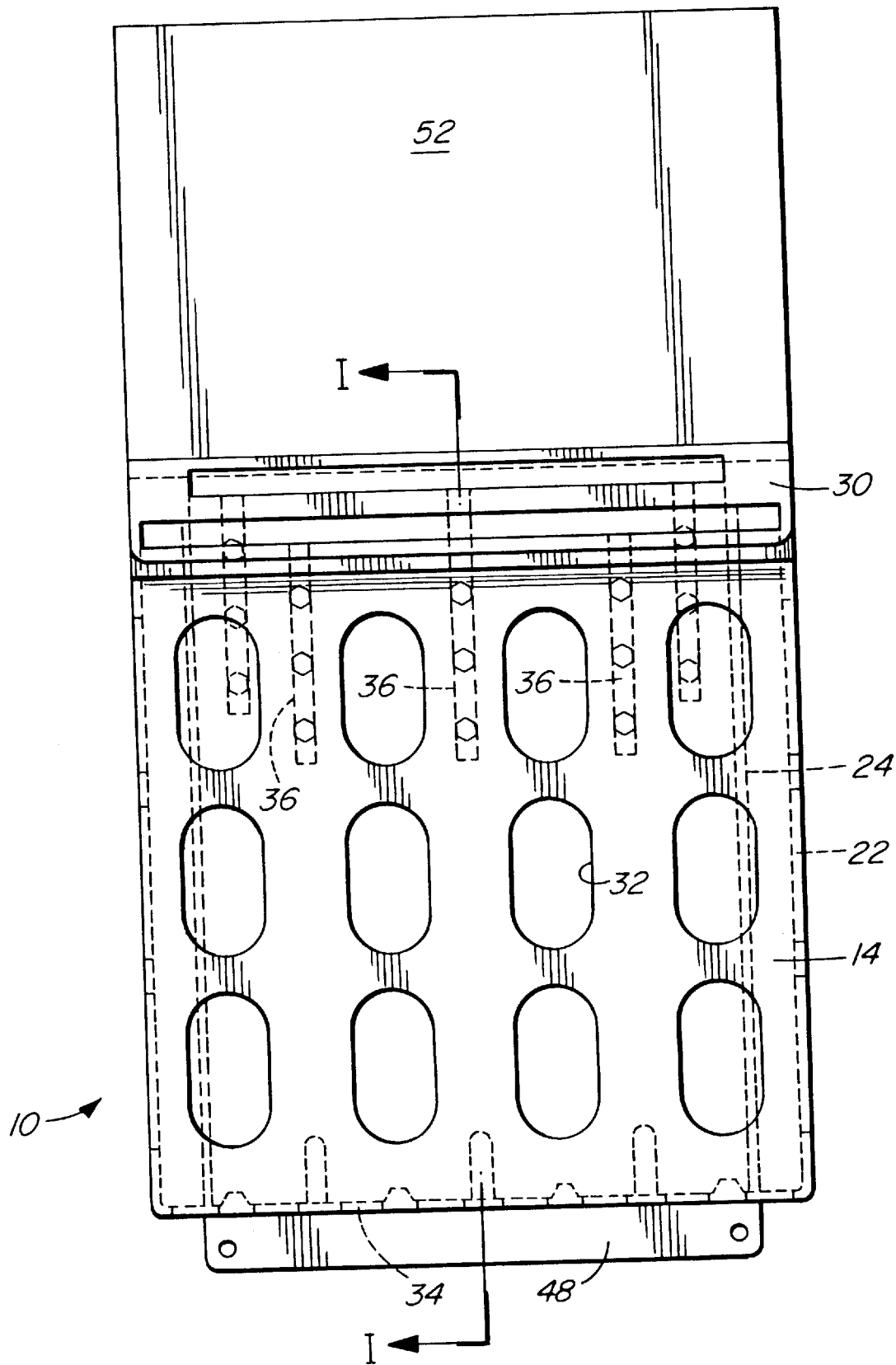
FIG. 2 shows a view in front elevation of the ski rack of FIG. 1.

The ski rack shown in the drawings is indicated generally by reference numeral 10 and has two upwardly-open recesses or pockets, indicated generally by reference numeral 12, for receiving skis and snowboards, as described in greater detail below.

More particularly, the ski rack has two parallel vertical walls 14 and 15 (FIG. 3), which are spaced-apart to define therebetween a space 16, and two further walls 18 and 19, which are parallel to the walls 14 and 15 and which are spaced-apart from one another to define therebetween a further space 20.

The walls 14 and 15 are connected by side walls 22, and the walls 18 and 19 are connected by side walls 24.

At the bottom of the space 16, a bottom portion 26 extends between the walls 14, 15 and 22, and that the bottom of the space 20 a bottom portion 28 extends between the walls 18, 19 and 24.

The walls 15 and 18 are connected by a bridge portion 30.

The side walls 22 and 24 are formed with elongate openings 32, and the bottom portions 26 and 28 are formed with circular openings 34, to allow snow and slush to fall out from the spaces 16 and 20.

The spaces 16 and 20 serve to receive the lower ends of skis (not shown) inserted downwardly into the spaces 16 and 20 and retained by the bottom portions 28.

Also, the spaces 16 and 20 are each provided with three laterally spaced spacers in the form of spacer members 36, which are secured to the walls 14 and 18 by means of bolts 38.

As can be seen from FIG. 1, three of the spacer members 36 are provided in the space 16, and are thus suitable for spacing-apart four skis inserted into this space between the spacer members 36 and the side walls 22.

It will also be seen from FIG. 1 that the spacer members 36 in the space 20 are spaced-apart from one another by a distance greater than the space in between the spacer members 36 in the space 16. The purpose of this is to accommodate wider skis, e.g. parabolic skis, and fat boy skis in the space 20 than can be accommodated between the spacer members 36 in the space 16.

Figure 3:
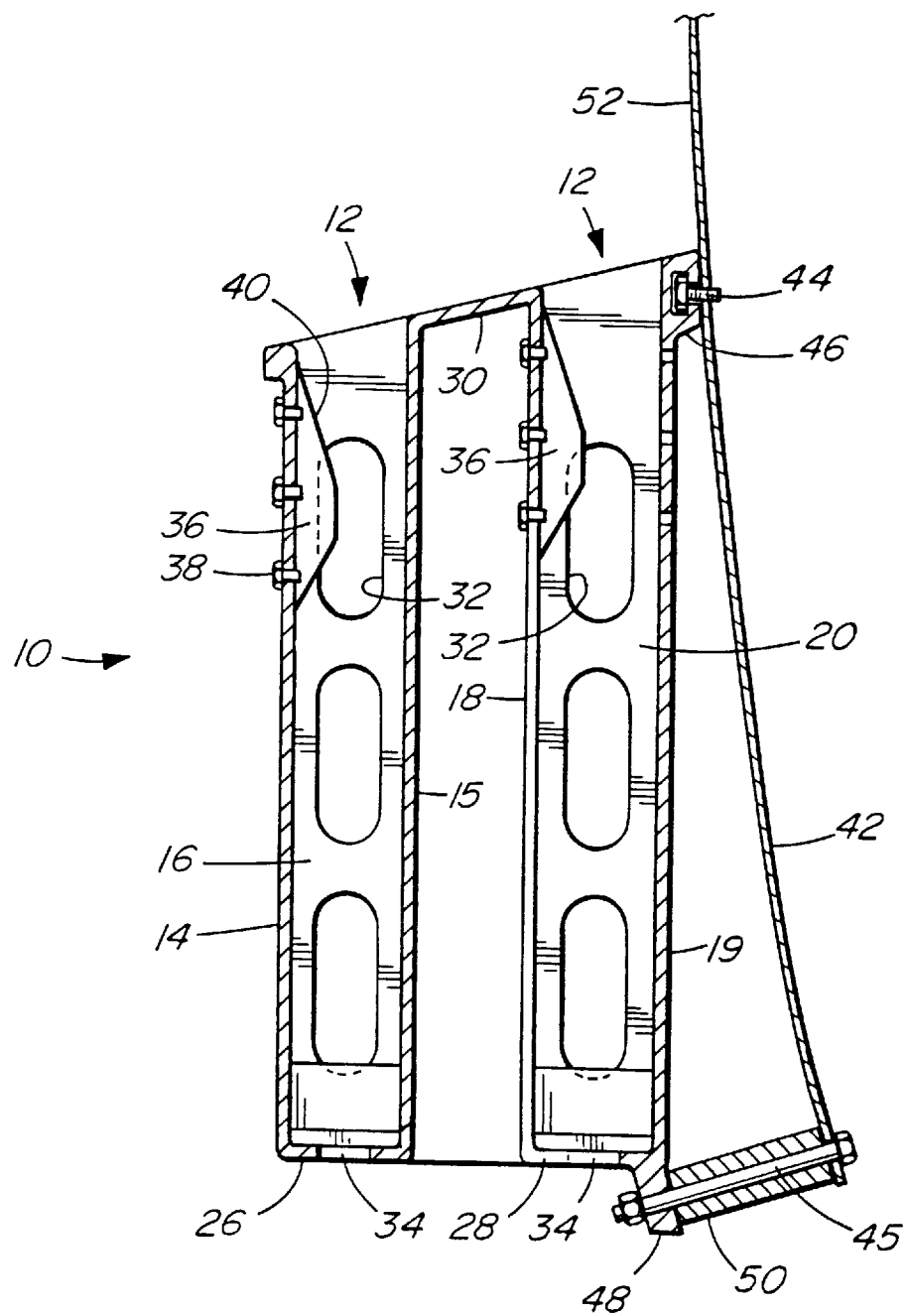
FIG. 3 shows a view taken in cross-section along the line A—A of FIG. 2.

Also, as can be seen from FIGS. 1 and 3, the spacer members 36 in the space 16 are each spaced-apart by a gap from the wall 15, and, likewise, the spacer members 36 in the space 20 are also spaced-apart by a gap from the wall 19. These gaps allow the insertion into the spaces 16 and 20 of a snowboard having a width substantially greater than that of a ski and, thus, substantially greater than the lateral spacings of the spacer members 36.

Also, as can be seen from FIG. 3, the spacer members 36 each have an outer edge 40 which is inclined downwardly and laterally so as to facilitate the sliding of the snowboard into the space 16 or 20.

Further spacer members 41 project upwardly from the bottom portions 26 and 28, in alignment with the spacer members 36 for holding the lower ends of the skis apart from one another.

The rack 10 can be supported from a gondola door 42 by means of bolts 44 and 45, engaging in projecting ledges 46 and 48 projecting from the walls 19, the bolts 45 being provided with spacer sleeves 50.

Also, a protective apron 52 may be provided extending upwardly from the portion 46 for protecting the outer surface of the gondola from scratching and the like by the insertion of the skis.

As will be apparent to those skilled in the art, various modifications may be made in the above-described embodiment of the invention within the scope of the appended claims.

I claim:

1. A ski rack, comprising:

first and second walls defining therebetween a space for receiving a plurality of skis;

a bottom portion extending between said walls at the bottom of said space; and spacers projecting from one of said walls towards the other of said walls for spacing the skis apart from one another;

said spacers being spaced from the other of said walls by a gap sufficient to accommodate a snowboard, whereby said rack can be used to carry the snowboard.

2. A ski rack as claimed in claim 1, wherein said spacers extend along said space in a direction towards said bottom portion and have downwardly inclined edges extending in said direction and spaced from said other wall by said gap, whereby sliding of the snowboard into the gap is facilitated.

3. A ski rack as claimed in claim 1 or 2, including further spacers projecting upwardly from said bottom portion in alignment with said first-mentioned spacers for holding the lower ends of the skis apart from one another.

* * * * *